United States Patent

Kuszynski

[15] 3,682,412
[45] Aug. 8, 1972

[54] SAFETY RESTRAINT SYSTEM RETRACTION DEVICE

[72] Inventor: Gregory G. Kuszynski, Pasadena, Calif.

[73] Assignee: American Safety Equipment Corporation, New York, N.Y.

[22] Filed: Sept. 22, 1969

[21] Appl. No.: 859,930

[52] U.S. Cl. .............................. 242/107.4, 242/107.6
[51] Int. Cl. ............................................ A62b 35/00
[58] Field of Search ........... 242/107, 107 SB, 107.12, 107.2, 242/107.3, 107.6; 297/388, 389; 280/150 SB

[56] References Cited

UNITED STATES PATENTS

| 2,488,858 | 11/1949 | Franz | 297/388 |
| 3,058,687 | 10/1962 | Bentley | 242/107.4 |
| 3,439,933 | 4/1969 | Jantzen | 297/388 X |
| 3,486,792 | 12/1969 | Stoffel | 297/389 X |
| 3,526,431 | 9/1970 | Boedigheimer et al | 242/107.4 X |

Primary Examiner—Stanley N. Gilreath
Assistant Examiner—Werner H. Schroeder
Attorney—Miketta, Glenny, Poms & Smith

[57] ABSTRACT

A safety restraint system for use in a vehicle having a seat with a backrest through which an occupant is restrained during emergency conditions. The system includes a shoulder or chest belt mounted at one end to a retraction device permitting protraction of the belt to a first length so that it may be connected to a restraint element and disposed diagonally across the upper torso of the occupant. This first length may be selected so that the belt is in non-pressure contact with the occupant when the occupant is seated. The retraction device may permit further protraction of the belt in response to movement of the occupant providing the protraction does not exceed a predetermined acceleration level. An improvement provides for selectively preventing the belt from retracting after protraction to the first length and in which the safety belt may be protracted to a further length by movement of the occupant but prevented from retracting to a length less than the first length so that the safety belt returns to the non-pressure contact length subsequent to every protraction due to movement of the occupant as allowed by the inertia-responsive retraction device.

9 Claims, 8 Drawing Figures

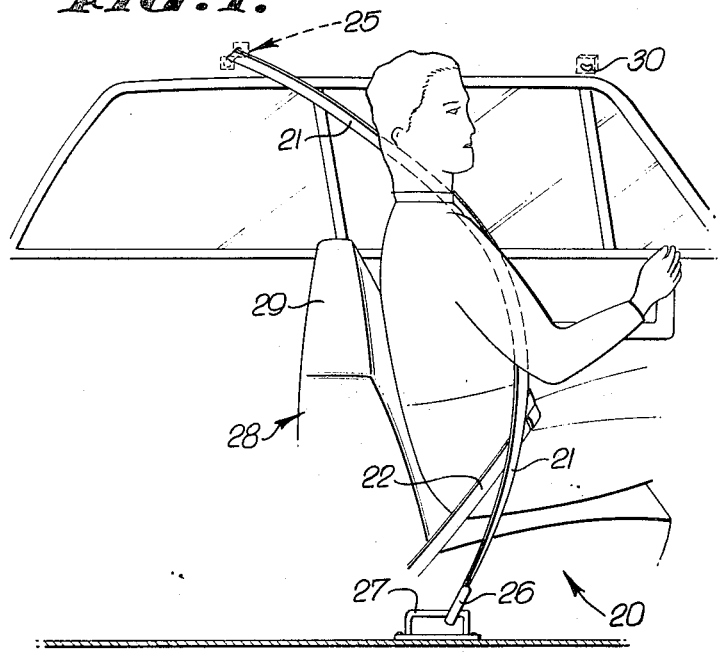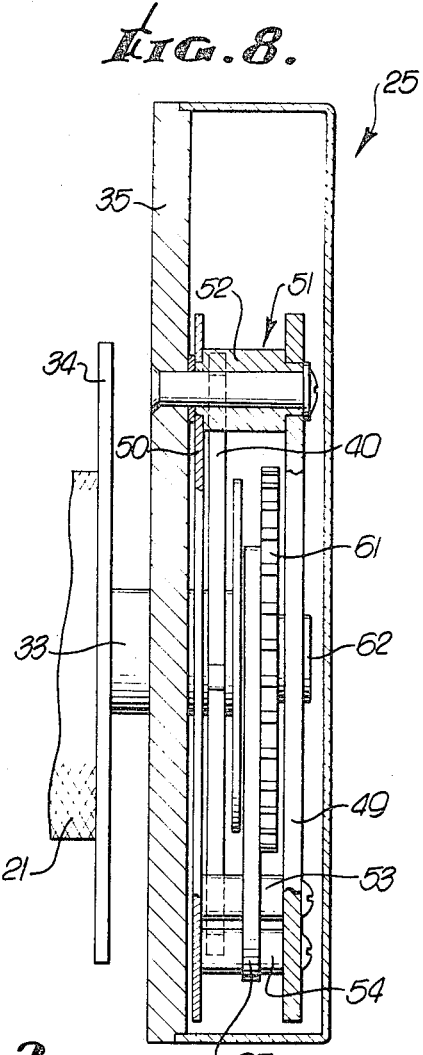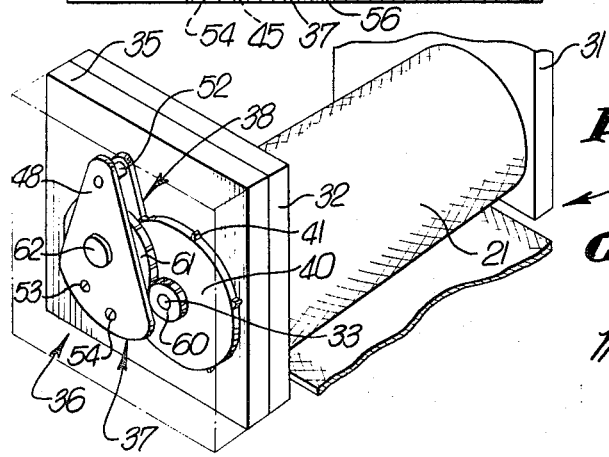

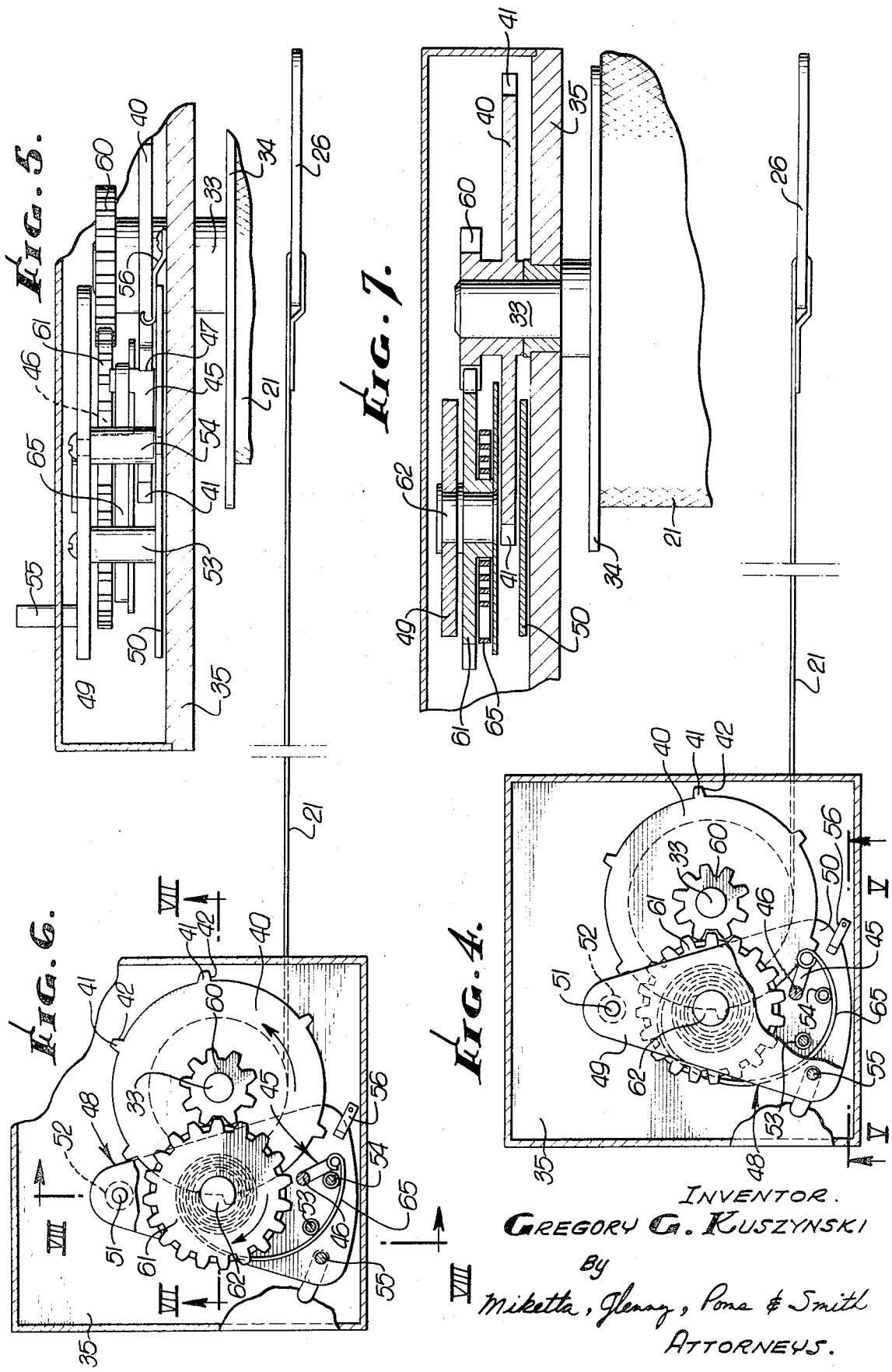

SAFETY RESTRAINT SYSTEM RETRACTION DEVICE

BACKGROUND AND PRIOR ART

This invention relates to a device to which a flexible elongated element may be mounted for protraction and retraction and may be extended to a selected length and thereafter selectively prevented from retracting to a shorter length and if extended or protracted to a greater length will be prevented from retracting to a length less than the selected length. In a particular application, the invention relates to a retraction device for use in a vehicle safety restraint system to restrain an occupant during emergency conditions while maintaining the belt in non-pressure contact with the occupant during normal driving conditions.

It is well known in the prior art to provide an automatic locking safety belt retractor for a belt used within a vehicle for the application of restraining forces and which normally permits the belt to be freely protracted and retracted from a wound up condition so that the occupant can perform normal movements but which responds to forces created during emergency conditions which give rise to excessive acceleration levels so as to lock the retraction reel against rotation preventing further protraction of the belt. In these commonly called inertia-responsive retraction devices, the belt is freely extendable from a stored condition during normal operation of the vehicle but when the vehicle experiences sudden changes in momentum, as in a collision or panic stop, the inertia of the occupant tends to displace him from the seated position in a direction corresponding to the former travel of the vehicle. Such displacement of the occupant produces an accelerated extension of the belt from its wound up position so that locking means is triggered by the accelerated extension of the belt to lock the belt from further protraction and restraining the occupant from contacting surfaces within the vehicle passenger compartment.

In these prior art retraction devices, the safety belt is constantly urged into the wound up or retracted position by spring means. Thus, when the belt is in use, there is a constant tension in the belt equal to the pulling force of the spring that retracts the belt. Where the belt is of considerable length, such spring force may be appreciable and thus cause considerable discomfort on the occupant and is at least an inconvenience. While in a non-inertia retraction device system it has been found possible to lock the retractor against further protraction of the belt to create a tensionless system, the problem with respect to inertia devices is more difficult. In an inertia-responsive retraction device system, the belt must be locked against retraction after the length is selected by the occupant which relieves tension from the occupant's body, and such length must be reestablished each time the belt is protracted by the occupant through his movement.

It is accordingly a principal object of the present invention to provide in a safety belt restraint system including an inertia-responsive retraction device to which a belt is mounted at one end and adapted for connection to a complementary restraint element at the other end, to provide an improvement wherein the safety belt may be protracted to a selected length as desired by the occupant and thereafter prevented from retraction to a shorter length even after further protraction of the belt due to movement of the occupant and subsequent retraction.

Another object of the present invention is to provide a device of the last-described type in which the length selected by the occupant maintains a safety belt in non-pressure contact with the occupant's body and in which the occupant may move forward in the vehicle passenger compartment during normal operating conditions while being restrained during emergency conditions and in which such movements will cause protraction and subsequent retraction of the belt from the first selected length such that the belt will always assume a length that does not apply pressure to the occupant's body.

It is also an object of this invention to provide an improvement in a device including a frame, a rotatably mounted reel, and a flexible elongated element secured at one end to the reel and wound therearound for selective protraction and retraction, such improvement providing for selective prevention of the element for retracting after protraction to a first length and provision permitting the element to be protracted to a further length and preventing the element from retracting to a length less than the first length.

SUMMARY OF THE INVENTION

In a device comprising a frame, a rotatably mounted reel, a flexible elongated element secured at one end to the reel and wound therearound for selective protraction and retraction, the improvement comprising one way stop means associated with the reel for selectively preventing the elongated element from retracting after protraction to a first length, and means permitting the element to be protracted to a further length and preventing the element from retracting to a length less than the first length. In one exemplary embodiment, the device comprises an inertia-responsive retractor employed in a safety restraint system for use in a vehicle to restrain an occupant during emergency conditions and the flexible elongated element may be a safety belt mounted to such retractor for permitting protraction of the belt to a first length against yielding spring-biased retraction wherein the free end of the belt may be connected to a fixed complementary restraint element to effect an operative occupant restraint system and for subsequently permitting further protraction of the belt in response to movement of the occupant providing such protraction does not exceed a predetermined acceleration level. In such exemplary embodiment, the vehicle has a seat with a backrest and the safety belt may be protracted to a first length selected so that the belt is in non-pressure contact with the occupant when the occupant is comfortably seated and leaning against the backrest, so that further protraction of the belt as allowed by the inertia-responsive device, and subsequent retraction under the bias of the retractor device spring will be permitted by the improvement but will limit the retraction to a length no less than the selected first length so that the non-pressure contact position of the safety belt with respect to the occupant is reestablished after each protraction.

BRIEF DESCRIPTION OF THE DRAWINGS

FIG. 1 is a side elevation view of a safety restraint system in a vehicle which includes a shoulder belt positioned diagonally across the upper torso of a vehicle occupant when in use and retracted to a stored position by a retraction device;

FIG. 2 is a perspective view of the retraction device shown in FIG. 1 including an exemplary embodiment of an improvement in accordance with the present invention;

FIG. 3 is a side elevation view of the device shown in FIG. 2 showing the improvement in non-operative position;

FIG. 4 is a view as in FIG. 3 showing the improvement in operative position and the safety belt protracted to a first length and prevented from retraction;

FIG. 5 is a sectional view taken along the plane V—V of FIG. 4;

FIG. 6 is a view as in FIG. 3 showing the safety belt protracted to a length further than the first length and allowed to retract to a length no less than the first length;

FIG. 7 is a sectional view taken along the plane VII—VII of FIG. 6; and

FIG. 8 is a sectional view taken along the plane VIII—VIII of FIG. 6.

DETAILED DESCRIPTION OF A PREFERRED EMBODIMENT

Referring now to FIG. 1, there is shown a safety restraint system for use in a vehicle to restrain an occupant during emergency conditions, such as in a crash, sudden vehicle deceleration, or the like. The exemplary system shown is generally Known as a three-point system indicated generally at 20 comprising a shoulder belt 21 and a seat belt 22. The shoulder belt 21 is mounted at its upper end to a retraction device indicated generally at 25 and has a connector 26 at its free end. The free lower end of the belt 21 is secured to a complementary fixed restraint element 27 mounted on the vehicle floor. Such complementary restraint element may, of course, comprise a strap secured at one end to the floor and carrying a complementary connector at its free end, in a manner well known in the art.

In the three-point restraint system, the shoulder belt 21 is manually protracted to a first selected length at which the connector 26 may be attached to the restraint element 27 so that the shoulder belt passes diagonally across the chest or upper torso of the occupant. During such use, the occupant is seated in seat 28 having a backrest 29 against which the occupant leans during normal driving conditions.

With further reference to FIG. 2, the retraction device 25, in the exemplary embodiment, may comprise an inertia reel retractor of the type well known in the art. Such inertia reels, for example, are disclosed in U.S. Pat. Nos. 2,403,653, 2,434,119, 2,953,315, 3,402,899 and many others. Such devices may be vehicle and/or man sensitive and include a reel to which the belt is attached, the reel being constantly spring biased urging the belt to full retraction and thus maintaining a constant tension on the belt and pressure on the occupant's chest during use. The occupant, however, is free to move during non-emergency conditions but is restrained, through locking of the belt by an inertia-operated mechanism, which may have a manual override. In use, as illustrated in FIG. 1, the shoulder belt 21 passes diagonally across the chest of the wearer and is urged into pressure contact with the wearer's chest, allowing him to move forward to operate controls in the vehicle, or perform any other desired change in position.

It will be understood that the inertia-responsive retraction device shown and described is only exemplary and that the present invention may be used with a linear inertia-retraction device, such as shown in U.S. Pat. Nos. 3,371,960, 3,419,308, 3,431,019 and others.

It is also important to understand that while a three-point safety belt restraint system is shown and described in connection with the preset invention, other safety belt configurations may employ an inertia-responsive retraction device and the improvement of the present invention. Exemplary alternative restraint system configurations are shown in U.S. Pat. Nos. 2,705,115, 2,705,586, 2,850,082, 2,889,146, and 3,178,225. It will also be noted that in three-point systems other than as shown here, the retraction device for the shoulder belt may be mounted on the vehicle floor, rather than the roof, as shown in U.S. Pat. No. 3,420,573. In the exemplary embodiment shown in FIG. 1 where the retraction device 25 is mounted to the roof of the vehicle, there is provided a hook or attachment element 30 also supported by the roof of the vehicle to which the connector 26 of the safety belt may be attached when the safety belt is not in use and after the slack in the belt has been retracted through the device 25.

Referring now to FIG. 2, the retraction device 25 is seen to comprise a frame including a pair of upstanding walls 31, 32, an arbor or shaft 33 (see FIG. 8) rotatably supported by the walls 31, 32 and carrying a reel 34 (see FIG. 8) to which shoulder belt 21 is mounted and wound around. It will of course be understood that the strap or webbing of the shoulder belt may be attached to a cable rather than wound around the reel directly, in a system such as that shown in U.S. Pat. No. 2,403,653. Within the housing 35 adjacent the upstanding wall 32, there is provided, as is well known in the art, means for constantly biasing the shoulder belt 21 for full retraction, such as a coil spring. Also within housing 35 there may be provided means for permitting protraction of the shoulder belt in response to movement of the occupant provided the rate of protraction does not exceed a predetermined acceleration level. Such inertia-responsive mechanism is well known in the art and fully disclosed in the aforementioned patents. If desired, the device may be provided with means for deactivating the inertia-responsive mechanism during initial protraction of the shoulder belt so that the belt may be grasped by the occupant and rapidly protracted to the point at which it may be connected to the complementary restraint element without the inconvenience of repetitive locking of the device due to excessive acceleration. All of the above-described components of the shoulder belt restraint system are well known in the art.

The present invention comprises an improvement of the prior art retraction devices, such improvement generally including selectively actuatable means indicated generally at 36 which includes one way stop means indicated generally at 37 for preventing the belt from retracting after protraction to the first selected length. In this embodiment, the first length may be selected by the occupant such that the safety belt will be in non-pressure contact with he occupant's chest during use of the restraint system. In other words, the occupant may protract the belt 21, connect to the complementary restraint element 27, and then protract the belt an additional small increment so that when the occupant is comfortably seated and leaning against the backrest 29, the belt is slightly spaced from the occupant's chest. Ideally, this additional length is such that the occupant can place his fist between his chest and the belt, as this amount of slack will provide adequate restraint during an emergency, while relieving pressure contact. After the belt is connected, and the additional increment is protracted, means 37 is actuated so as to prevent the belt from retracting from this first length. In this condition, it will be appreciated that there is no tension on the belt and thus no pressure on the occupant.

The means 36 also includes means for selectively rendering said one way stop means operative and inoperative so that shoulder belt 21 may be protracted further in response to forward movement of the occupant (which is permitted by the inertia-responsive device so long as the predetermined acceleration level is not exceeded during movement) and preventing the belt from retracting to a length less than the first length. The occupant is free to move so as to protract the belt as in the well-known prior art inertia responsive systems, but the belt is prevented from retracting further than the length which maintains the belt tensionless. Thus, the occupant can make normal movement during use of the system, have complete protection against an emergency deceleration, and still have no pressure exerted against his chest.

The exemplary embodiment of the one way stop means 37 for selectively preventing the belt from retraction after protraction to the first length comprises a ratchet wheel 40 concentric and rotatable with the reel 34 and mounted on the arbor 33. The ratchet wheel 40 includes a plurality of circumferentially spaced teeth 41, each tooth having an abutment surface 42, the teeth 41 being concentrically formed with respect to the axis of the arbor 33. The ratchet wheel 40 is arranged laterally outwardly of the housing 35 of the inertia-responsive device 25.

One way stop means 37 also includes a pawl 45 pivotally mounted through a pin 46 and having an abutment surface 47 (see FIG. 5). Means 38 for selectively rendering the one-way stop means operative and inoperative includes a frame indicated generally at 48 carrying pin 46 on which pawl 45 is mounted. Frame 48 comprises a pair of arms 49, 50 pivotally mounted to housing 35 through a pin 51. The arms 49, 50 as seen best in FIG. 8, are held in spaced apart relation by an enlarged diameter portion 52 on pin 51 and at the opposite end by spacers 53 and 54. It will be understood that frame 48 may be movable from a position in which the one-way stop means is inoperative, as seen in FIG. 3, to a position in which the one-way stop means is operative, as seen in FIG. 4. Frame 48 may be linearly slidable or otherwise mounted for movement of pawl 45 from a position in which it cannot engage ratchet wheel 40 to a position in which it may engage the ratchet wheel and thus rendering the one-way stop means inoperative or operative as selected. In the exemplary embodiment shown, the frame 48 is manually movable by handle 55 carried by frame 48. Of course, the handle could be located anywhere in the vehicle convenient to the occupant and suitably connected to the frame. Moreover, movement of the frame may be effected by other than manual operation. A catch 56 is mounted on the wall of housing 35 for maintaining the frame 48 in the position in which the pawl 45 can engage the ratchet wheel 40, i.e., the position in which the one-way stop means is operative.

In the exemplary embodiment, the means 38 for selectively rendering the one-way stop means inoperative. a pair of gears 60, 61. Gear 60 is mounted on arbor 33 so as to be concentric and rotatable with reel 34 and ratchet wheel 40. Gear 61 is mounted on a shaft 62 carried by arm 49 of frame 48, as seen best in FIG. 7.

Beside the gears 60, 61, the means for rendering the one-way stop means operative or inoperative includes an element, which may be a spirally wound spring 65, connected at one end to shaft 62, passing around spacers 53, 54, and connected to the free end of pawl 45. Element 65 is such that it can both push and pull pawl 45 about its pivot point 46. It should also be noted that spacer 54 provides a stop limit for pivotal movement of pawl 45.

Operation of the aforedescribed system will now be described. Assume that the occupant enters the vehicle and the safety belt 21 is maintained in the out-of-the-way position by connection of latch element 26 to hook 30. When the occupant is seated he may reach up with one hand disconnecting the free end of the safety belt from hook 30 and pulling the belt downward so as to protract the belt from the retraction device 25. The belt is protracted to a length whereupon connector 26 may be attached to restraint element 27. As previously described, an additional increment of safety belt may now be protracted so that the belt is in non-pressure contact with the occupant's chest. The occupant may then reach and through handle 55 station frame 48 so that the pawl 45 and ratchet wheel 40 are in an engageable position. Since there is no tension on spiral element 65, the pawl 45 will be in the position shown in FIG. 4 so as to engage the abutment surface 42 of one of the teeth 41 thereby preventing retraction of the safety belt 21 from the selected first length.

With the frame 48 in the position as shown in FIG. 4, the system is ready for use as a tensionless safety belt restraint system. Should an emergency occur, wherein the occupant is thrown forward in the vehicle compartment, the belt 21 will be rapidly protracted and the reel 34 rapidly rotated so that the inertia-responsive mechanism will exceed the predetermined acceleration level and the reel will be locked against further protraction preventing the occupant from contact with any surface on the interior of the vehicle. It should be noted that the improvement of the present invention in no way interferes with the normal operation of the inertia-responsive device and no loads are carried through the elements comprising the improvement so that such elements may be of inexpensive and light weight materials.

During normal conditions, the occupant may wish to reach forward within the vehicle passenger compartment to operate certain controls, reach the glove compartment, or otherwise, causing protraction of the safety belt 21. Such movement will not exceed the predetermined acceleration level of the inertia-responsive device, however, so that the reel is not locked. Such protraction causes rotation of reel 34, arbor 33, and gear 61, through gear 60 so as to rotate shaft 62. Thus, protraction of belt 21 will wind the spiral element 65 so as to pivot pawl 45 from the position shown in FIG. 4, to the position shown in FIG. 6 where it is stopped by spacer element 54. Accordingly, ratchet wheel 40 is free to turn without any interference and the belt may be freely protracted. Upon completion of such movement, when the occupant again leans back against backrest 29, the belt will slowly retract. This will cause counter-rotation of reel 34 and through gear 60 counter-rotation of gear 61 and shaft 62 so as to unwind the spiral element 65 at the same rate at which it was wound so that immediately preceding complete unwinding thereof the element will push pawl 45 into the position shown in FIG. 4, i.e., engagement with the teeth 41 on ratchet wheel 40. Thus, retraction of the safety belt 21 is limited to a belt length as first selected.

When the occupant has completed use of the restraint system, connector 26 may be detached and attached to hook element 30. The occupant may then move frame 48 through handle 55 so as to station the pawl and ratchet in non-engageable position so that the retraction spring in the inertia-responsive device will draw the belt taut to the out-of-the-way position.

From the preceding description of the structure and operation of the present invention, it will be apparent that all of the above-stated objects and advantages of the improvement to the safety restraint system retraction device are accomplished by the exemplary embodiment. Other modifications and variations of the present invention are possible in light of the above teachings. It is therefore to be understood that within the scope of the appended claims, the invention may be practiced otherwise than as specifically described.

I claim:

1. In a safety restraint system for use in a vehicle having a seat with a backrest and in which an occupant is restrained during emergency conditions comprising at least one safety belt mounted at one end to a reel from which the belt may be selectively protracted to a first length and connected at the other end to a fixed complementary restraint element so as to be disposed diagonally across the upper torso of the occupant, means constantly biasing said belt to full retraction, said first length selected so that said belt is in non-pressure contact with said occupant when said occupant is seated, protraction of said belt in response to movement of said occupant being permitted providing said protraction does not exceed a predetermined acceleration level, the provision of:

stop means for selectively preventing said belt from retracting after protraction to said first length so that said occupant may select such first length such that said safety belt will be in non-pressure contact with said occupant during use of said safety restraint system, and means for rendering said stop means operative or inoperative, so that said safety belt returns to the non-pressure contact length with respect to said occupant subsequent to every protraction of said safety belt due to movement of the occupant away from the seat backrest.

2. The safety restraint system of claim 1 wherein said stop means for selectively preventing said safety belt form retracting after protraction to said first length comprises a ratchet wheel concentric and rotatable with said reel and a pawl mounted for selective movement to a position from which said pawl is engageable with said ratchet wheel.

3. The provision of claim 2 wherein said means for rendering said stop means operative or inoperative comprises a frame carrying said pawl and movable to position said pawl in said engageable position, and means for engaging and disengaging said pawl and ratchet when said pawl is in said engageable position in response to protraction and subsequent retraction of said safety belt with respect to said first length.

4. The improvement of claim 3 wherein said means for engaging and disengaging said pawl and ratchet wheel when in said engageable position includes a pair of gears, one of said gears being concentric and rotatable with said reel and said ratchet wheel and the other of said gears carried by said frame and meshed with said first gear when said frame positions said pawl in said engageable position, said other gear in operative engagement with an element connected to said pawl for movement thereof in response to rotation of said wheel.

5. In a device comprising a frame, a rotatably mounted reel, a flexible elongated element secured at one end to the reel and wound therearound for selective protraction and retraction to and from a first length, respectively, and means constantly urging said element toward full retraction, the improvement comprising:

one-way stop means comprising a ratchet wheel rotatable with said reel and a pawl; and means for rendering said one-way stop means operative by movement of said pawl to a position in which it is engageable with said ratchet wheel and for rendering said one-way stop means inoperative by movement of said pawl into another position in which it is not engageable with said ratchet wheel in response to further protraction of the elongated element and upon subsequent retraction of the elongated element to the first length again rendering the pawl in the position engageable with said ratchet wheel.

6. The improvement of claim 5 wherein said means for rendering said one-way stop means operative and inoperative comprises an element connected to said pawl for movement thereof in response to rotation of said reel.

7. The improvement of claim 6 wherein said means for rendering said one-way stop means operative and inoperative additionally includes a pair of gears, said gears being meshed when said pawl is in said engageable position, one of said gears rotatable with said reel and the other of said gears in operative engagement with said element.

8. The improvement of claim 5 wherein said element comprises a spirally wound spring in operative engagement with said gear through a common shaft.

9. The improvement of claim 7 wherein said means for rendering said stop means operative and inoperative additionally comprises a frame carrying said pawl, said frame being manually selectively movable from a position in which said pawl is engageable with said ratchet wheel to a position in which said pawl is not engageable with said ratchet wheel.

* * * * *